United States Patent
Valzasina et al.

(10) Patent No.: US 10,466,052 B2
(45) Date of Patent: Nov. 5, 2019

(54) MICROELECTROMECHANICAL GYROSCOPE WITH COMPENSATION OF QUADRATURE ERROR DRIFT

(71) Applicant: STMICROELECTRONICS S.R.L., Agrate Brianza (IT)

(72) Inventors: Carlo Valzasina, Gessate (IT); Luca Giuseppe Falorni, Limbiate (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 133 days.

(21) Appl. No.: 15/201,133

(22) Filed: Jul. 1, 2016

(65) Prior Publication Data

US 2016/0313123 A1 Oct. 27, 2016

Related U.S. Application Data

(63) Continuation of application No. 14/067,051, filed on Oct. 30, 2013, now Pat. No. 9,404,747.

(51) Int. Cl.
*G01C 19/5712* (2012.01)
*G01C 19/56* (2012.01)
(Continued)

(52) U.S. Cl.
CPC ......... *G01C 19/5712* (2013.01); *G01C 19/56* (2013.01); *G01C 19/574* (2013.01); *G01C 19/5719* (2013.01); *G01C 19/5747* (2013.01)

(58) Field of Classification Search
CPC .. G01C 19/5747; G01C 19/56; G01C 19/574; G01C 19/5712; G01C 19/5719
See application file for complete search history.

(56) References Cited

U.S. PATENT DOCUMENTS 4,159,125 A 6/1979 Buchwald
4,744,248 A 5/1988 Stewart
(Continued)

FOREIGN PATENT DOCUMENTS

DE 10 2006 046 772 A1 4/2008
EP 0 1 619 471 A1 1/2006
(Continued)

OTHER PUBLICATIONS

Schofield et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

*Primary Examiner* — Helen C Kwok
(74) *Attorney, Agent, or Firm* — Seed IP Law Group LLP

(57) ABSTRACT

A microelectromechanical gyroscope, includes: a supporting body; a first movable mass and a second movable mass, which are oscillatable according to a first driving axis and tiltable about respective a first and second sensing axes and are symmetrically arranged with respect to a center of symmetry; first sensing electrodes and a second sensing electrodes associated with the first and second movable masses and arranged on the supporting body symmetrically with respect to the first and second sensing axis, the first and second movable masses being capacitively coupled to the respective first sensing electrode and to the respective second sensing electrode, a bridge element elastically coupled to respective inner ends of the first movable mass and of the second movable mass and coupled to the supporting body so as to be tiltable about an axis transverse to the first driving axis.

20 Claims, 5 Drawing Sheets

(51) Int. Cl.
*G01C 19/5719* (2012.01)
*G01C 19/574* (2012.01)
*G01C 19/5747* (2012.01)

(56) References Cited

U.S. PATENT DOCUMENTS

| | | | |
|---|---|---|---|
| 4,750,364 A | 6/1988 | Kawamura et al. | |
| 5,392,650 A | 2/1995 | O'Brien et al. | |
| 5,447,068 A | 9/1995 | Tang | |
| 5,728,936 A | 3/1998 | Lutz | |
| 5,895,850 A | 4/1999 | Buestgens | |
| 5,955,668 A | 9/1999 | Hsu et al. | |
| 6,158,280 A | 12/2000 | Nonomura et al. | |
| 6,230,563 B1 | 5/2001 | Clark et al. | |
| 6,250,156 B1 | 6/2001 | Seshia et al. | |
| 6,308,567 B1 | 10/2001 | Higuchi et al. | |
| 6,349,597 B1 | 2/2002 | Folkmer et al. | |
| 6,513,380 B2 | 2/2003 | Reeds, III et al. | |
| 6,520,017 B1 | 2/2003 | Schoefthaler et al. | |
| 6,535,800 B2 | 3/2003 | Wallner | |
| 6,722,197 B2 | 4/2004 | Knowles et al. | |
| 6,725,719 B2 | 4/2004 | Cardarelli | |
| 6,752,017 B2 | 6/2004 | Willig et al. | |
| 6,766,689 B2 | 7/2004 | Spinola Durante et al. | |
| 6,837,107 B2 | 1/2005 | Geen | |
| 6,845,665 B2 | 1/2005 | Geen | |
| 6,848,304 B2 | 2/2005 | Geen | |
| 6,928,872 B2 | 8/2005 | Durante et al. | |
| 7,155,976 B2 | 1/2007 | Kai-Cheng et al. | |
| 7,210,351 B2 | 5/2007 | Lo et al. | |
| 7,240,552 B2 | 7/2007 | Acar et al. | |
| 7,284,429 B2 | 10/2007 | Chaumet et al. | |
| 7,322,242 B2 | 1/2008 | Merassi et al. | |
| 7,347,094 B2 | 3/2008 | Geen et al. | |
| 7,398,683 B2 | 7/2008 | Lehtonen | |
| 7,454,246 B2 | 11/2008 | Merfeld | |
| 7,461,552 B2 | 12/2008 | Acar | |
| 7,481,111 B2 | 1/2009 | Caminada et al. | |
| 7,513,155 B2 | 4/2009 | Jeong et al. | |
| 7,694,563 B2 | 4/2010 | Durante et al. | |
| 7,765,869 B2 | 8/2010 | Sung et al. | |
| 7,797,998 B2 | 9/2010 | Menard et al. | |
| 7,907,177 B2 | 3/2011 | Haino et al. | |
| 7,950,281 B2 | 5/2011 | Hammerschmidt | |
| 8,020,441 B2 | 9/2011 | Seeger | |
| 8,037,756 B2 | 10/2011 | Caminada et al. | |
| 8,037,757 B2 | 10/2011 | Johnson | |
| 8,042,394 B2 | 10/2011 | Coronato et al. | |
| 8,042,396 B2 | 10/2011 | Coronato et al. | |
| 8,117,912 B2 | 2/2012 | Kawakubo et al. | |
| 8,250,921 B2 | 8/2012 | Nasiri et al. | |
| 8,256,290 B2 | 9/2012 | Mao | |
| 8,261,614 B2 | 9/2012 | Hartmann et al. | |
| 8,272,267 B2 | 9/2012 | Tamura et al. | |
| 8,312,769 B2 | 11/2012 | Coronato et al. | |
| 8,342,023 B2 | 1/2013 | Geiger | |
| 8,342,025 B2 | 1/2013 | Coronato et al. | |
| 8,347,717 B2 | 1/2013 | Seeger et al. | |
| 8,353,212 B2 | 1/2013 | Hammer | |
| 8,375,789 B2 | 2/2013 | Prandi et al. | |
| 8,413,506 B2 | 4/2013 | Coronato et al. | |
| 8,429,970 B2 | 4/2013 | Rocchi | |
| 8,459,110 B2 | 6/2013 | Cazzaniga et al. | |
| 8,464,585 B2 | 6/2013 | Raman et al. | |
| 8,534,127 B2 | 9/2013 | Seeger et al. | |
| 8,549,915 B2 | 10/2013 | Schofield et al. | |
| 8,549,919 B2 | 10/2013 | Günthner et al. | |
| 8,616,057 B1 | 12/2013 | Mao | |
| 8,667,842 B2 | 3/2014 | Prandi | |
| 8,960,002 B2 | 2/2015 | Nasiri et al. | |
| 9,003,882 B1 | 4/2015 | Ayazi et al. | |
| 9,010,184 B2 | 4/2015 | Zou et al. | |
| 9,038,461 B2 | 5/2015 | Kanemoto | |
| 9,194,704 B2 | 11/2015 | Lin et al. | |
| 9,404,747 B2 * | 8/2016 | Valzasina | G01C 19/5747 |
| 2002/0078746 A1 | 6/2002 | Mochida | |
| 2002/0134154 A1 | 9/2002 | Hsu et al. | |
| 2002/0189351 A1 | 12/2002 | Reeds et al. | |
| 2004/0172167 A1 | 9/2004 | Pasolini et al. | |
| 2006/0112764 A1 | 6/2006 | Higuchi | |
| 2007/0062282 A1 | 3/2007 | Akashi et al. | |
| 2007/0198187 A1 | 8/2007 | Pasolini et al. | |
| 2007/0214883 A1 * | 9/2007 | Durante | G01C 19/5712 73/504.04 |
| 2008/0276706 A1 | 11/2008 | Hartmann et al. | |
| 2009/0056443 A1 | 3/2009 | Netzer | |
| 2010/0078740 A1 | 4/2010 | Cazzaniga et al. | |
| 2010/0126272 A1 | 5/2010 | Coronato et al. | |
| 2010/0149721 A1 | 6/2010 | Prandi | |
| 2010/0192690 A1 | 8/2010 | Classen et al. | |
| 2010/0236327 A1 * | 9/2010 | Mao | G01C 19/5719 73/504.12 |
| 2011/0023600 A1 | 2/2011 | Wrede et al. | |
| 2011/0023604 A1 | 2/2011 | Cazzaniga et al. | |
| 2011/0030473 A1 | 2/2011 | Acar | |
| 2011/0061460 A1 * | 3/2011 | Seeger | G01C 19/5719 73/504.12 |
| 2011/0154898 A1 * | 6/2011 | Cazzaniga | G01C 19/5747 73/504.12 |
| 2011/0303007 A1 | 12/2011 | Rocchi | |
| 2012/0024056 A1 * | 2/2012 | Hammer | G01C 19/5712 73/504.02 |
| 2012/0031977 A1 | 2/2012 | Havens et al. | |
| 2012/0060604 A1 | 3/2012 | Neul et al. | |
| 2012/0061172 A1 | 3/2012 | Yacine | |
| 2012/0210789 A1 | 8/2012 | Kanemoto | |
| 2013/0031977 A1 * | 2/2013 | Kempe | G01C 19/5747 73/504.04 |
| 2013/0125649 A1 * | 5/2013 | Simoni | G01P 15/18 73/504.04 |
| 2013/0167636 A1 | 7/2013 | Coronato et al. | |
| 2013/0174661 A1 | 7/2013 | Kuhlmann et al. | |
| 2015/0059473 A1 * | 3/2015 | Jia | G01C 19/5747 73/504.12 |

FOREIGN PATENT DOCUMENTS

| | | |
|---|---|---|
| EP | 2 108 964 A2 | 10/2009 |
| JP | 2005-241500 A | 9/2005 |
| WO | 2006/043890 A1 | 4/2006 |
| WO | 2007/086849 A1 | 8/2007 |
| WO | 2007/145113 A1 | 12/2007 |
| WO | 2009/033915 A1 | 3/2009 |

\* cited by examiner

MICROELECTROMECHANICAL GYROSCOPE WITH COMPENSATION OF QUADRATURE ERROR DRIFT

BACKGROUND

Technical Field

The present disclosure relates to a microelectromechanical gyroscope with compensation of quadrature error drift.

Description of the Related Art

As is known, use of microelectromechanical systems is becoming more and more widespread in several fields of technology and has lent encouraging results, especially in manufacturing of inertial sensors, microintegrated gyroscopes and electromechanical oscillators for various applications.

MEMS of this type are generally based on microelectromechanical structures comprising a supporting body and at least on movable mass, coupled to the supporting body through flexures. Flexures are configured to allow the movable mass to oscillate with respect to the supporting body in accordance with one or more degrees of freedom. The movable mass is capacitively coupled to a plurality of static electrodes on the supporting body, thus forming capacitors with variable capacitance. The movement of the movable mass with respect to the static electrodes on the supporting body, e.g., on account of external forces, modifies the capacitance of the capacitors; hence, it is possible to trace back to the displacement of the movable mass in respect of the supporting body and to the force applied. Vice versa, when appropriate bias voltages are provided, possibly through a separate set of driving electrodes, it is possible to apply an electrostatic force to the movable mass to set it in motion. Moreover, in order to provide microelectromechanical oscillators, it is conventional to exploit the frequency response of the MEMS structures, which is of the low-pass, second order type, with a resonance frequency.

The MEMS gyroscopes, in particular, have a more complex electromechanical structure, which, typically, comprises two masses movable with respect to the supporting body and coupled to each other in such a way as to leave one relative degree of freedom. The two movable masses are both capacitively coupled to the supporting body through static sensing and/or driving electrodes. One of the masses is dedicated to driving and is kept in oscillation at the resonance frequency with controlled oscillation amplitude. The other mass is drawn in the oscillatory motion (either translational or rotational) and, in case of rotation of the microstructure about a gyroscopic axis with an angular rate, is subjected to a Coriolis force that is proportional to the angular rate itself. In practice, the drawn mass acts as an accelerometer that allows to detect Coriolis force and to trace back to the angular rate. In some cases, a single mass is coupled to the supporting body so as to be movable with respect to the supporting body with two independent degrees of freedom. A driving device maintains the movable mass in controlled oscillation according to one of the two degrees of freedom. The movable mass moves in accordance with the other degree of freedom in response to a rotation of the supporting body about a sensing axis, on account of Coriolis force.

In order to properly operate, a MEMS gyroscope requires a driving device that maintains the movable mass in oscillation at the resonance frequency, and a reading device, to detect displacements of the drawn mass. These displacements are representative of the Coriolis force and of the angular rate are detectable through reading electric signals correlated to variations of the capacitance between the drawn mass and the static electrodes. Because of driving at the resonance frequency, the reading signals are in the form Dual Side Band—Suppressed Carrier (DSB-SC) signals. The carrier signal is defined by the oscillation velocity of the driving mass, at the mechanical resonance frequency.

However, the MEMS gyroscope has a complex structure and electromechanical interactions between the movable masses and supporting body are often non-linear, the useful signal components are mixed with spurious components that do not contribute to measurement of the angular speed. Spurious components may depend on several causes. For example, manufacturing defects and process spreads are virtually unavoidable sources of disturbance, the effect of which is not predictable.

A common defect depends on the fact that the direction of oscillation of the driving mass is not perfectly coincident with the intended design degree of freedom. Such a defect is normally due to imperfections in the elastic connections between the movable mass and the supporting body. This defect causes quadrature errors, i.e., signal components of unknown amplitude at the same frequency as the carrier and an 90° out of phase.

Quadrature components are in most cases so large that they cannot be simply neglected without introducing significant errors. Normally, factory calibration at the end of the manufacturing process allows to reduce errors within acceptable margins. However, the problem is not completely solved, because the amplitude of the quadrature components may vary during device lifetime. In particular, the supporting body may be deformed because of mechanical stress or temperature variations. In turn, deformations of the supporting body cause unpredictable variations in the movements of the masses and, consequently, in the quadrature components, that are no longer effectively compensated.

BRIEF SUMMARY

The present disclosure provides a microelectromechanical gyroscope that overcomes or at least mitigates the above described limitations.

According to the disclosure, there is provided a microelectromechanical gyroscope that includes:
- a supporting body;
- a first movable mass and a second movable mass, which, in respect of the supporting body, are oscillatable according to a first driving axis and tiltable respectively about a first sensing axis and a second sensing axis, the first movable mass and the second movable mass being symmetrically arranged with respect to a center of symmetry;
- a first sensing electrode and a second sensing electrode associated with the first movable mass and arranged on the supporting body symmetrically with respect to the first sensing axis, the first movable mass being capacitively coupled to the first sensing electrode and to the second sensing electrode;
- a further first sensing electrode and a further second sensing electrode associated with the second movable mass and arranged on the supporting body symmetrically with respect to the second sensing axis, the second movable mass being capacitively coupled to the respective first sensing electrode and second sensing electrode; and
- a bridge element elastically coupled to respective inner ends of the first movable mass and of the second movable mass and coupled to the supporting body so as to be tiltable about an axis transverse to the first driving axis.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
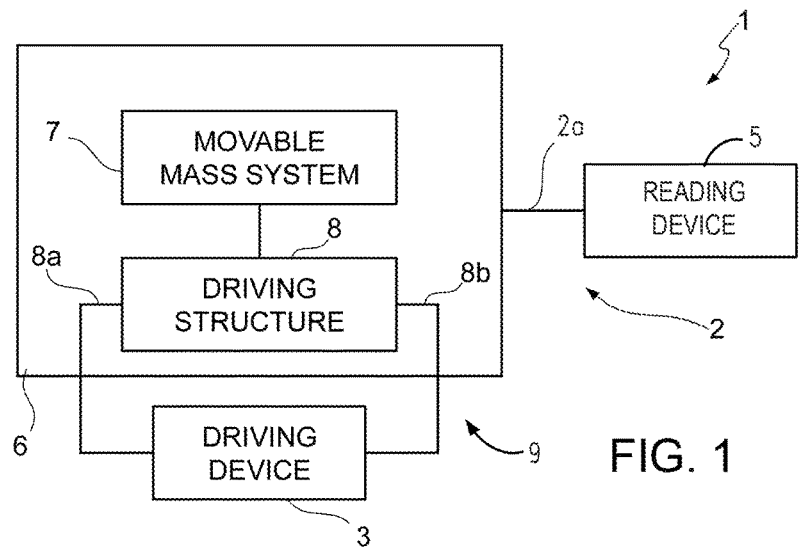
FIG. 1 is a simplified block diagram of a microelectromechanical gyroscope.

FIG. 1 shows as a whole a microelectromechanical gyroscope 1, which comprises a microstructure 2, made of semiconductor material, a driving device 3 and a reading device 5.

The microstructure 2 is made of semiconductor material and comprises a supporting body 6, a system of movable masses 7 and a driving structure 8.

The movable masses 7 are mechanically coupled to the supporting body 6 through elastic connections (here not shown) so that a first and a second respective relative degree of freedom are set between each one of the movable masses 7 and the supporting body 6. As discussed in greater detail later on, each one of the movable masses 7 has a translational degree of freedom, along a respective driving axis, and a rotary degree of freedom, which allows the movable mass to tilt about a respective sensing axis in response to rotations of the supporting body 6.

The driving structure 8 has driving terminals 8a and is configured to provide electrostatic driving force between the supporting body 6 and one or more of the movable masses 7 when a driving voltage is applied to the driving terminals 8a. In one embodiment, two movable masses 7 are symmetrically driven. The driving structure 8 is also configured so that applying a periodic voltage to the driving terminals 8a causes the driven movable masses 7 to oscillate along a driving axis. Feedback-sensing terminals 8b of the driving structure 8 supply sensing voltages representative of the position and/or speed of the driven movable masses 7 along the respective driving axes.

The driving device 3 is coupled to the driving terminals 8a and to the feedback-sensing terminals 8b of the driving structure 8 and forms, with the driven movable masses 7, a microelectromechanical loop 9 configured to control oscillation of the driven movable masses 7. Hence, the driven movable masses 7 are maintained in oscillation at a driving frequency with constant amplitude (the driving frequency is substantially equal to the resonance frequency of the elastic system comprising the movable masses 7 and their elastic connections).

The microstructure 2 is furthermore provided with sensing terminals 2a, which supply sensing signals representative of the position of the movable masses 7 in respect of the respective sensing axes.

The read device 5 is coupled to the sensing terminals 2a of the microstructure 2 and is configured to convert the sensing signals into output signals, which are representative of the angular rate of the supporting body 6 about a global sensing axis and may be obtained from a combination of contributions caused by individual responses of movable masses 7 in relation to respective sensing axes.

FIGS. 2-6 illustrates in greater detail the microstructure 2, which comprises the supporting body 6, a first movable mass 7a, a second movable mass 7b, a third movable mass 7c, a fourth movable mass 7d, the driving structure 8 and a central bridge 10. In an embodiment, however, the microstructure may comprise only two coupled masses, e.g., the first movable mass 7a and the second movable mass 7b or the third movable mass 7c and the fourth movable mass 7d.

In an embodiment, the supporting body 6 may include a semiconductor substrate, e.g., of monocrystalline silicon.

The movable masses 7a-7b, all of doped semiconductor material, are defined by respective plates of substantially trapezoidal shape, arranged symmetrically with respect to the center C of the microstructure 2 and parallel, in a rest condition, to a surface 6a of the supporting body 6 in an undeformed state. Specifically, the first movable mass 7a and the second movable mass 7b are arranged symmetrically to each other and extend along a first driving axis D1. The third movable mass 7c and the fourth movable mass 7d are arranged symmetrically to each other and extend along a second driving axis D2, perpendicular to the first driving axis D1.

The movable masses 7a-7d are mechanically coupled to the supporting body 6 through first elastic connections 11, which are in turn fixed to respective mass anchorages 12. The movable masses 7a-7d are furthermore mechanically coupled to one another through second elastic connections 13 and to the central bridge 10 through third elastic connections 15.

Figure 2:
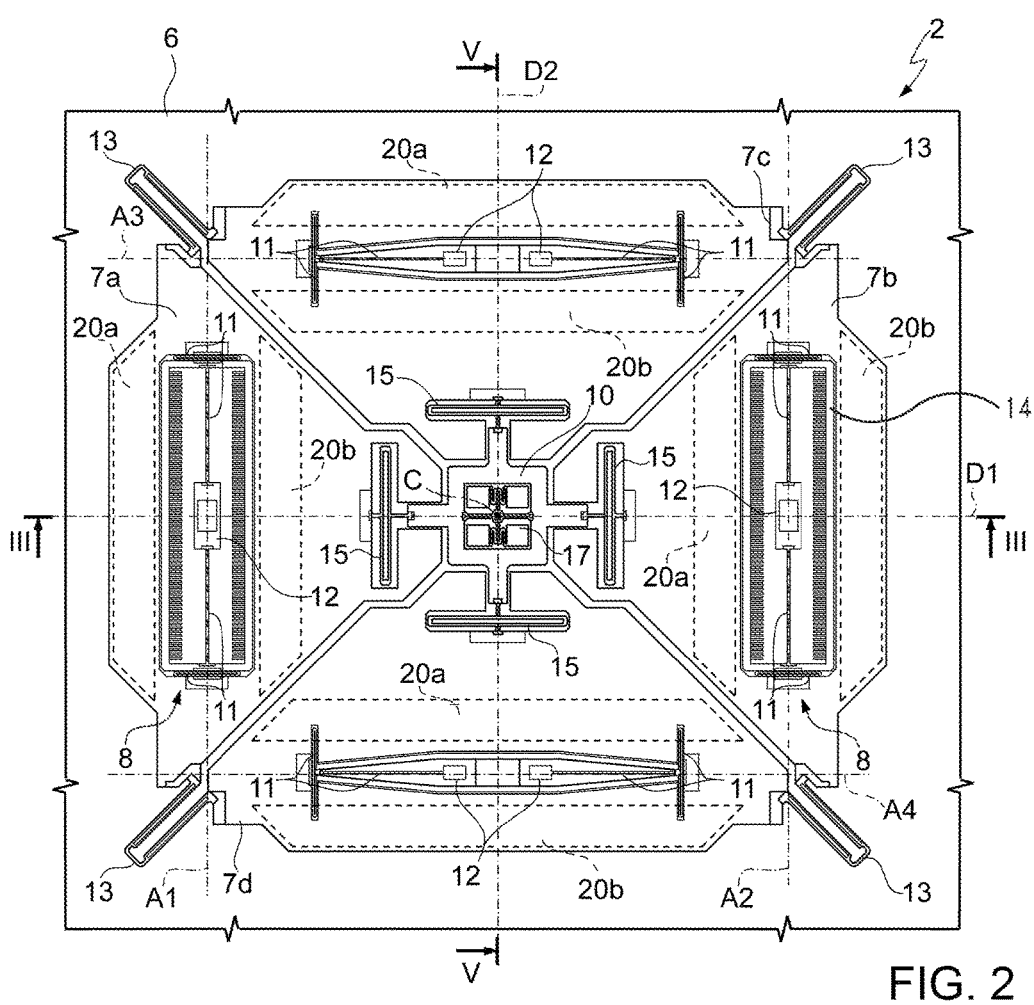
FIG. 2 is a top plan view of a microstructure incorporated in the gyroscope of FIG. 1 and made in accordance with an embodiment of the present disclosure.

The first elastic connections 11 are configured to allow first and second relative degrees of freedom of the first movable masses 7a-7d with respect to the supporting body 6. More precisely, the first movable masses 7a and the second movable mass 7b may translate along the first driving axis D1 and are tiltable about respective non-barycentric sensing axes A1, A2, which are perpendicular to the first driving axis D1. The third movable masses 7c and the fourth movable mass 7d may translate along the second driving axis D2 and are tiltable about respective non-barycentric sensing axes A3, A4, which are perpendicular to the second driving axis D2. The driving axes D1, D2 and the sensing axes A1-A4 are all parallel to the surface 6a of the supporting body 6 in the undeformed state. In the embodiment of FIG. 2, the first elastic connections 11 include linear elements between mass anchorages 12 and driving frames 14 of the movable mass 7a-7d and decoupling elements between the driving frames 14 and sensing portions of the respective movable masses 7a-7b. The linear elements provide for both translational and rotational degrees of freedom along the driving axes D1, D2, while the decoupling elements allow the movable masses 7a-7d to tilt.

Pairs of adjacent movable masses 7a-7d are coupled through respective second elastic connections 13. The second elastic connections 13 are configured to transmit alternating translatory motion from the first movable mass 7a and second movable mass 7b (which are electrostatically forced and set in oscillation along the first driving axis D1 by the driving structure 8, as explained hereinafter) to the third movable mass 7c and fourth movable mass 7d, which thus oscillate along the second driving axis D2.

Inner ends of the movable masses 7a-7d are moreover coupled to the central bridge 10 through the third elastic connections 15. The central bridge 10 is defined by a substantially quadrangular rigid semiconductor element, which is centrally constrained to a central anchorage 17 at the center C of the microstructure 2. The central bridge 10 is tiltable independently about both the first driving axis D1 and the second driving axis D2 and its center is connected to the supporting body 6 so that the distance between the center of the central bridge 10 and surface 6a of the supporting body remains constant (see in particular FIGS. 3 and 5).

Figure 3:
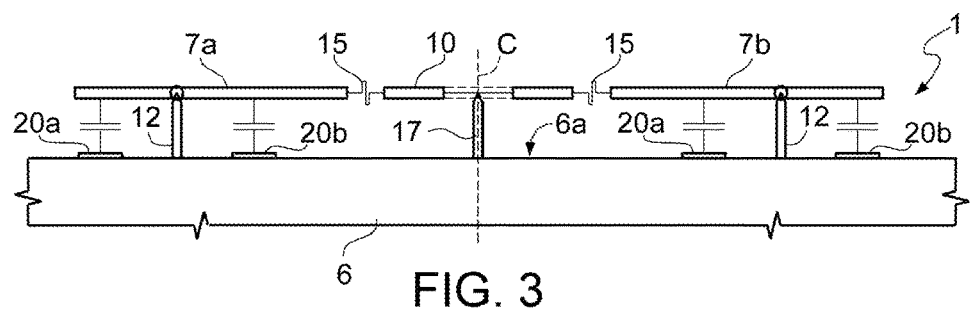
FIG. 3 is a cross section trough the gyroscope of claim 1 in a first operating configuration, taken along the line III-III of FIG. 2.
Figure 4:
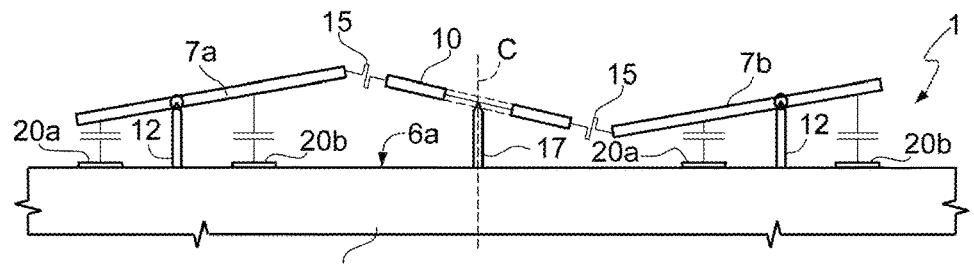
FIG. 4 shows the view of FIG. 3, in a second operating configuration.
Figure 5:
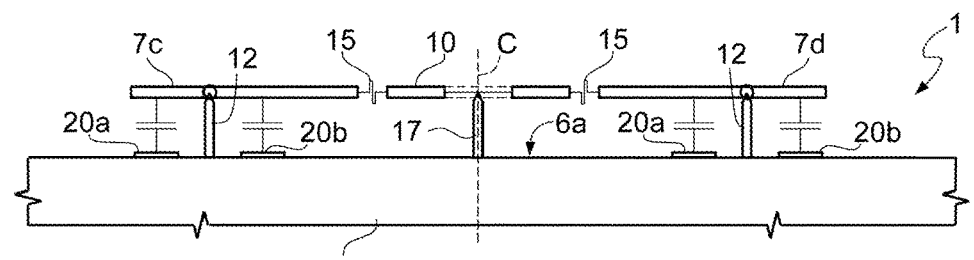
FIG. 5 is a cross section trough the gyroscope of claim 1 in a third operating configuration, taken along the line V-V of FIG. 2.
Figure 6:
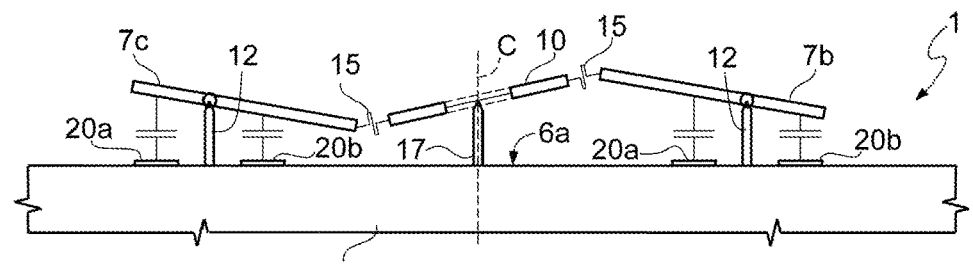
FIG. 6 shows the view of FIG. 3, in a fourth operating configuration.

As a result of the elastic connection to the central bridge 10, the first movable mass 7a and the second movable mass 7b are bound to rotate both clockwise or both counter-clockwise about the sensing axes A1, A2, respectively (see FIG. 3). Likewise, the third movable mass 7c and the fourth movable mass 7d are bound to rotate both clockwise or both counter-clockwise about the sensing axes A3, A4, respectively (see FIG. 5).

Figure 7:
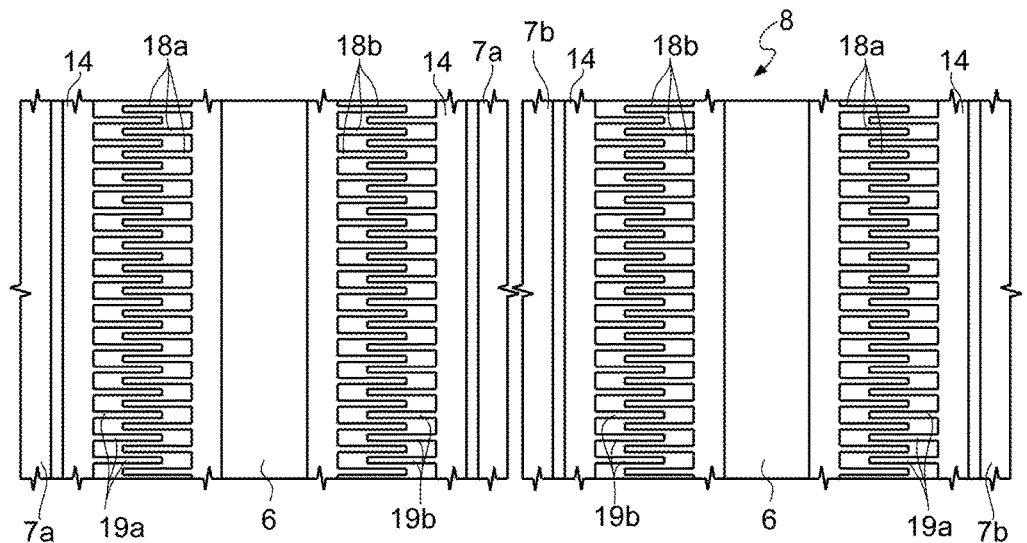
FIG. 7 is a top plan view of an enlarged detail of the microstructure of FIG. 2.

The driving structure 8 comprises sets of comb-fingered electrodes configured to apply attractive or repulsive electrostatic forces between the supporting body and the movable masses 7a, 7b, in directions parallel to the first driving axis D1. In an embodiment (FIGS. 2 and 7), sets of first static electrodes 18a and sets of second static electrodes 18b are anchored to the supporting body 6 and oriented in opposite directions, whereas the translatory portions of the first movable mass 7a and of the second movable mass 7b (driving frames 14 in the embodiment described) are provided each with respective sets of first movable electrodes 19a and of second movable electrodes 19b, also oriented in opposite directions. FIG. 7 is a top plan enhanced view of a portion of the gyroscope of FIG. 2, with some detail removed for simplicity.

Each set of first static electrodes 18a is capacitively coupled with a respective set of first movable electrodes 19a and each set of second static electrodes 18b is capacitively coupled with a respective set of second movable electrodes 19b. In an embodiment, coupled sets of electrodes are in comb-fingered configuration.

Static electrodes 18a, 18b and movable electrodes 19a, 19b are configured so that movable electrodes 19a, 19b are either attracted toward or repelled from the static electrodes 18a, 18b in accordance with the direction of electrostatic forces that are set up when voltages are applied. In turn, voltages may be caused by driving signals supplied to the driving terminals 8a (not shown in FIG. 7) of the driving structure 8. In an embodiment, the driving device 3 provides the driving signals in such a way that the first movable mass 7a and the second movable mass 7b move symmetrically in opposite directions along the first driving axis D1. By effect of the second elastic connections 13, also the third movable mass 7c and the fourth movable mass 7d move symmetrically in opposite directions along the second driving axis D2.

For the purpose of sensing rotations of the movable masses 7a-7d, first sensing electrodes 20a and second sensing electrodes 20b are provided on the surface 6a of the supporting body 6, between the supporting body 6 and the movable masses 7a-7d. One respective first sensing electrode 20a and one respective second sensing electrode 20b are associated with each one of the movable masses 7a-7d and are arranged symmetrically on opposite sides of the respective sensing axis A1-A4. The first sensing electrodes 20a and the second sensing electrodes 20b are capacitively coupled with the respective movable masses 7a-7d and form capacitors, the capacitance of which is variable and is determined by the angular position of the movable masses 7a-7d.

With reference to FIGS. 3-6, the first sensing electrodes 20a are arranged on the same side of sensing axes A1-A4 of the respective movable masses 7a-7d (i.e., on the left of sensing axes A1, A2 and above sensing axes A3, A4 in the view of FIG. 2). Thus, the distance of first sensing electrodes 20a from the respective movable masses 7a-7d is reduced in response to counter-clockwise rotations and increased in response to clockwise rotations and the capacitance of the corresponding capacitors increases and is reduced, respectively.

Likewise, the second sensing electrodes 20b are arranged on the same side of sensing axes A1-A4 of the respective movable masses 7a-7d (i.e., on the right of sensing axes A1, A2 and below sensing axes A3, A4 in the view of FIG. 2). The distance from the respective movable masses 7a-7d increases in response to counter-clockwise rotations and is reduced in response to clockwise rotations and the capacitance of the corresponding capacitors is reduced and increases, respective.

Moreover, the first sensing electrodes 20a and the second sensing electrodes 20b extend perpendicularly and symmetrically with respect to the driving axes D1, D2 of the respective movable masses 7a-7d.

In an embodiment, more than one sensing electrode 20a and one second sensing electrodes 20b may be associated with each movable mass 7a-7b. In this case, corresponding first sensing electrodes 20a and second sensing electrodes 20b are symmetrically arranged with respect to sensing axes A1-A4 as explained above.

Figure 8:
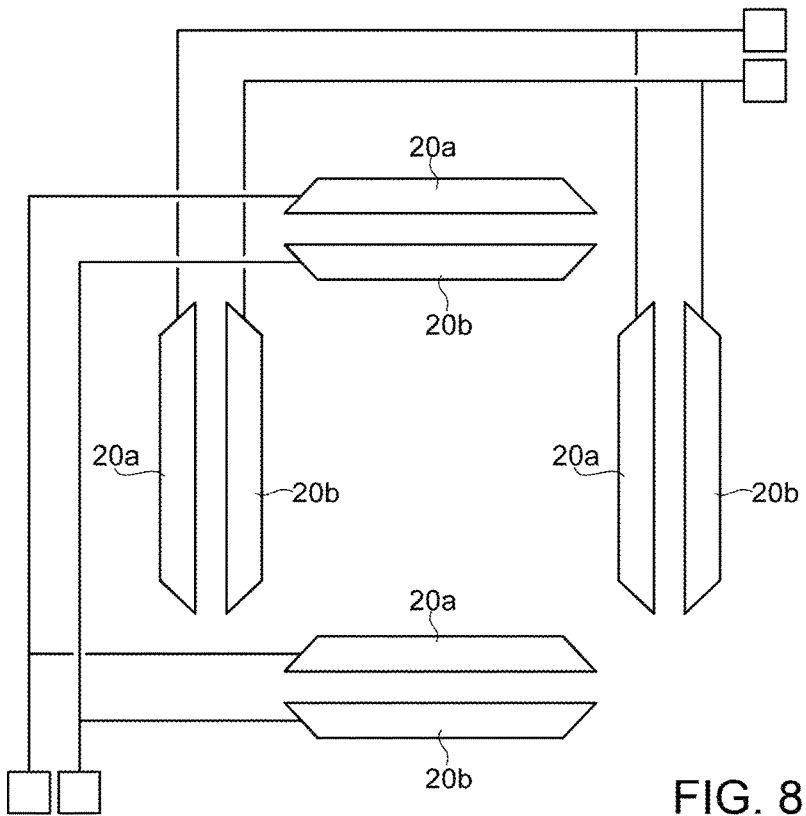
FIG. 8 is a simplified electrical diagram of a portion of the gyroscope of FIG. 1.

The first sensing electrodes 20a and the second sensing electrodes 20b of the first movable mass 7a are short-circuited respectively to the first sensing electrodes 20a and the second sensing electrodes 20b of the second movable mass 7b (FIG. 8). The first sensing electrodes 20a and the second sensing electrodes 20b of the third movable mass 7c are short-circuited respectively to the first sensing electrodes 20a and the second sensing electrodes 20b of the fourth movable mass 7d.

Figure 9:
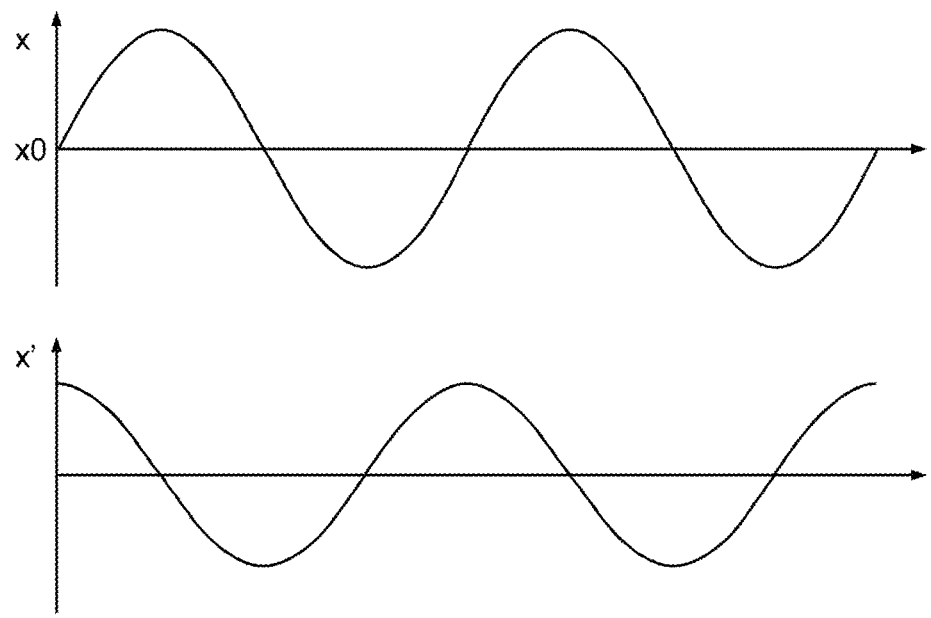
FIG. 9 is a graph showing quantities related to the gyroscope of FIG. 1.

It is to be noticed that, while the positions of the sensing electrodes 20a, 20b on the supporting body 6 are of course fixed, the positions of the sensing axes A1-A4 oscillate along the driving axes D1, D2 of the respective movable masses 7a-7d. However, the amplitude of oscillations is very small compared to the dimensions of the microstructure 2, including the distance between first sensing electrodes 20a and second sensing electrodes 20b associated with the same movable mass 7a-7d. Moreover, the Coriolis force that is responsible for the tilting of the movable masses 7a-7d, is proportional to the linear velocity of the movable masses 7a-7d along the respective driving axes D1-D2. Since the linear velocity is the derivative of position, which varies substantially sinusoidally in time about a rest position, the linear velocity is also sinusoidal and 90° out-of-phase with respect to position (see also the depiction of position x and linear velocity x' in FIG. 9 for one of the movable masses 7a-7d; x0 is the rest position). Thus the Coriolis forces on the movable masse 7a-7d are the highest when the movable masses 7a-7d pass by their rest position and fall to zero as they move away. Tilt of the movable masses 7a-7d is essentially determined in restricted regions around their rest positions. For these reasons, the position of the sensing axes A1-A4 may be fairly approximated as constant and coincident with the position at rest. This assumption has been made so far and will be made hereinafter when relative position and symmetry of sensing electrodes 20a, 20b in respect of sensing axe A1-A4 are considered.

Sets of sensing electrodes 20a, 20b form a fully differential sensing structure. Rotations of the movable masses 7a-7d caused by Coriolis forces in response to rotations of the supporting body 6 about any one of the sensing axes A1-A4 are detected by reading variations of the capacitive coupling between the movable masses 7a-7d and the corresponding first sensing electrodes 20a and second sensing electrodes 20b.

Possible quadrature errors due to imperfections of manufacturing processes may be compensated through factory calibration.

Figure 10:
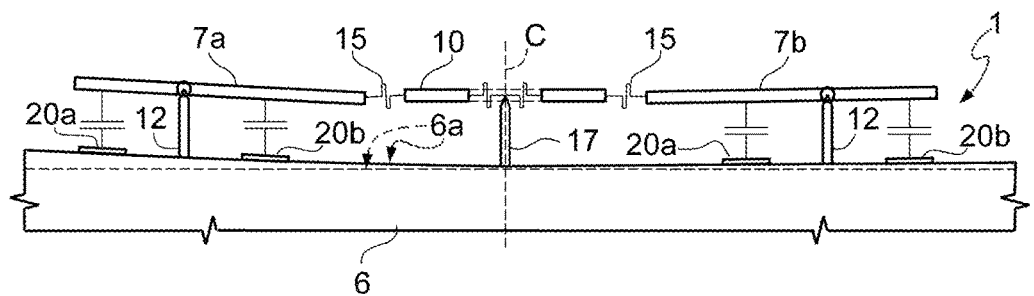
FIG. 10 shows the view of FIG. 3, in case of deformation of the microstructure.

Mechanical or thermal stress may subsequently cause the supporting body 6 to be deformed, as illustrated in FIG. 10 by way of example (the undeformed configuration of the supporting body 6 is shown by a dashed line). However, first sensing electrodes 20a and second sensing electrodes 20b coupled to the same movable mass 7a-7d are arranged symmetrically around the respective sensing axes A1-A4 and close to each other, in any case at least in part within the perimeter of the corresponding movable mass 7a-7d. So, although general symmetry of the microstructure 2 is lost because of external factors, local symmetry may be maintained. Effects of driving mismatch between movable masses 7a-7d oscillating along the same driving axis D1, D2 are avoided, because each movable mass 7a-7d is coupled to a respective first sensing electrode 20a and to a respective second sensing electrode 20b. Moreover, the mass anchorages 12 slightly bend when the supporting body 6 is deformed, because of rigid connection, and the movable masses 7a-7d tend to remain parallel to the surface 6a of the supporting body 6. In fact, the mechanical coupling through the third elastic connections 15 allows minor adjustments of the static configuration of the microstructure 2. As a result of the mutual proximity of the sensing electrodes and adaptation of the static configuration, deformations of the supporting body 6 have reduced effect in terms of variations of the capacitive coupling between the movable masses 7a-7d and the sensing electrodes 20a, 20b and in terms of drift of the quadrature signal components. Decoupling of the drive and sense modes of the gyroscope is thus improved and sensitivity to mechanical and thermal stress is reduced, to the benefit of the general performance of the device.

Figure 11:
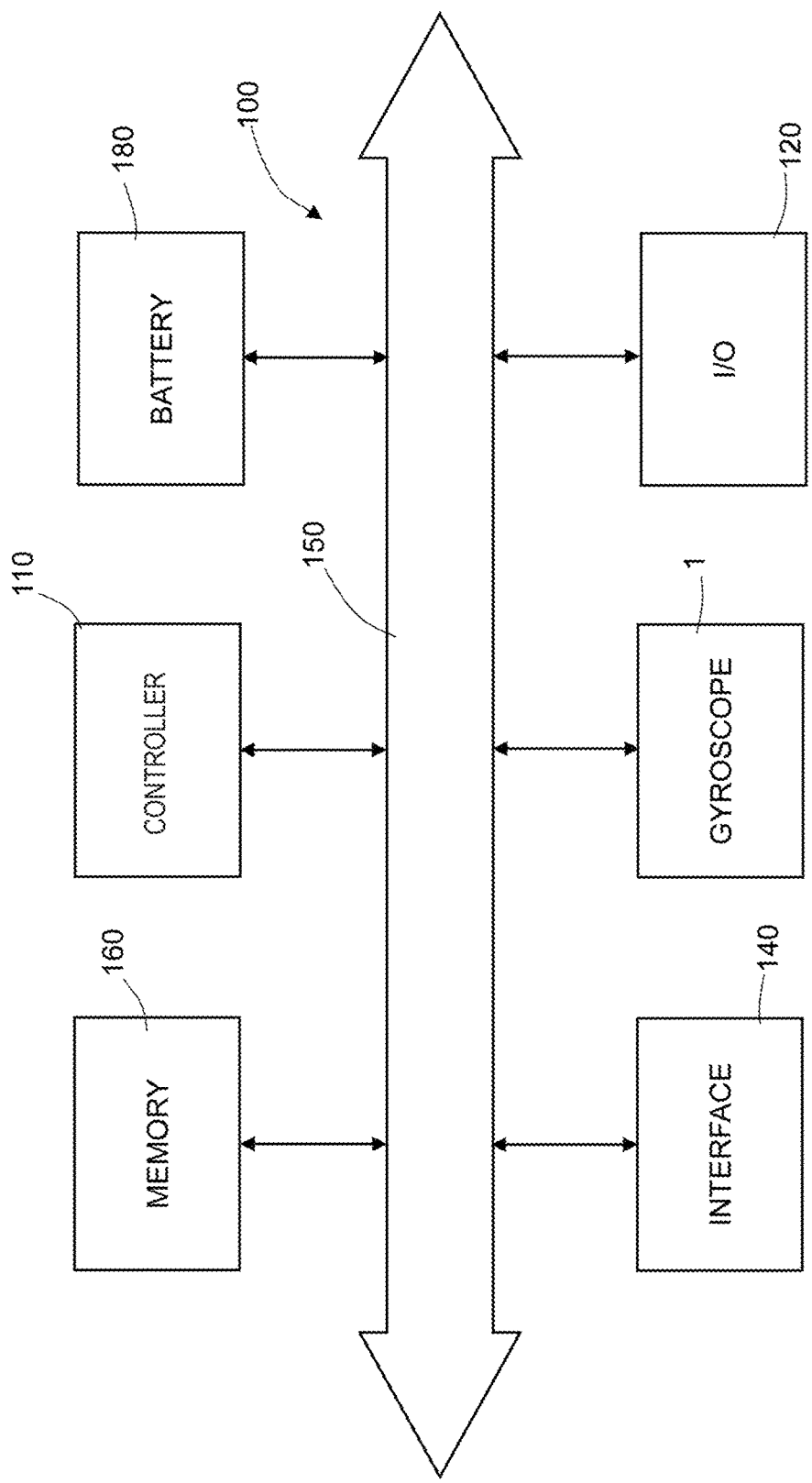
FIG. 11 is a simplified block diagram of an electronic system incorporating a microelectromechanical gyroscope according to one embodiment of the present disclosure.

FIG. 11 illustrates a portion of an electronic system 100 according to one embodiment of the present disclosure. The system 100 incorporates the gyroscope 1 and may be used in devices as, for example, a tablet computer, a laptop or portable computer, possibly with wireless capacity, a smartphone, a messaging device, a digital music reader, a digital camera or other devices designed to process, store, transmit or receive information. For example, the gyroscope 1 may be used in a digital camera for detecting movements and carrying out an image stabilization. In other embodiments, the gyroscope 1 may be included in a portable computer, a PDA, or a smartphone for detecting a free-fall condition and activating a safety configuration or to activate or control functions based on device motion. In a further embodiment, the gyroscope 1 may be included in a user interface activated by movement for computers or consoles for videogames. In a further embodiment, the gyroscope 1 may be incorporated in a satellite-navigation device and is used for temporary tracking of position in the case of loss of the satellite-positioning signal.

The electronic system 100 may comprise a controller 110, an input/output (I/O) device 120 (for example a keyboard or a screen), the gyroscope 1, a wireless interface 140, and a memory 160, of a volatile or nonvolatile type, coupled to one another through a bus 150. In one embodiment, a battery 180 may be used for supplying the system 100. It is to be noted that the scope of the present disclosure is not limited to embodiments having necessarily one or all of the devices listed.

The controller 110 may comprise, for example, one or more microprocessors, microcontrollers, and the like.

The I/O device 120 may be used for generating a message. The system 100 may use the wireless interface 140 for transmitting and receiving messages to and from a wireless-communications network with a radiofrequency (RF) signal. Examples of wireless interface may comprise an antenna, a wireless transceiver, such as a dipole antenna, even though the scope of the present disclosure is not limited from this standpoint. In addition, the I/O device 120 may supply a voltage representing what is stored either in the form digital output (if digital information has been stored) or in the form analogue output (if analogue information has been stored).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a substrate;
a first pair of masses;
a plurality of driving electrodes positioned within each of the masses of the first pair of masses;
a second pair of masses;
a plurality of first elastic coupling elements coupled between the first pair of masses and the second pair of masses, the second pair of masses being configured to move in response to movement of the first pair of masses through the plurality of first elastic coupling elements;
a plurality of second elastic coupling elements positioned within the second pair of masses;
a plurality of mass anchorages on the substrate and respectively coupled to the second elastic coupling elements;
a first pair of sensing electrodes on the substrate and positioned between the substrate and a first mass of the second pair of masses, the electrodes of the first pair of sensing electrodes being spaced apart from each other by a respective one of the plurality of second elastic coupling elements, a first mass anchorage of the plurality of mass anchorages being positioned between the electrodes of the first pair of sensing electrodes, the electrodes of the first pair of sensing electrodes being spaced apart from each other by the first mass anchorage; and a second pair of sensing electrodes on the substrate and positioned between the substrate and a second mass of the second pair of masses, the electrodes of the second pair of sensing electrodes being spaced apart from each other by a respective one of the plurality of second elastic coupling elements, a second mass anchorage of the plurality of mass anchorages being positioned between the electrodes of the second pair of sensing electrodes, the electrodes of the second pair of sensing electrodes being spaced apart from each other by the second mass anchorage.

2. The device of claim 1 wherein each of the masses of the first pair and the second pair of masses are trapezoidal.

3. The device of claim 1, further comprising a third pair and a fourth pair of sensing electrodes on the substrate and aligned with the first pair of masses, the electrodes of each of the third pair and the fourth pair of electrodes being spaced from each other by respective ones of the plurality of driving electrodes.

4. The device of claim 1, further comprising a central support and a central anchor that couples the central support to the substrate.

5. The device of claim 4 wherein the central support includes a plurality of extensions that extend into the masses of the first pair and second pair of masses.

6. A device, comprising:
a substrate;
a first, a second, a third, and a fourth mass positioned above the substrate;
a central support structure including a first extension that extends into an opening in the first mass along a first direction, a second extension that extends into an opening in the second mass along a second direction, a third extension that extends into an opening in the third mass along a third direction, and a fourth extension that extends into an opening in the fourth mass along a fourth direction;
a first elastic connection having a first end connected to the first extension and a second end connected to the first mass, the first and second ends of the first elastic connection being aligned with the first extension along the first direction, the first elastic connection including a transverse portion positioned within the opening in the first mass and extending in a direction transverse to the first direction, the transverse portion being connected between the first end and the second end of the first elastic connection and spaced apart from the first mass in the direction transverse to the first direction;
a second elastic connection having a first end connected to the second extension and a second end connected to the second mass, the first and second ends of the second elastic connection being aligned with the second extension along the second direction, the second elastic connection including a transverse portion positioned within the opening in the second mass and extending in a direction transverse to the second direction, the transverse portion being connected between the first end and the second end of the second elastic connection and spaced apart from the second mass in the direction transverse to the second direction;

a third elastic connection having a first end connected to the third extension and a second end connected to the third mass, the first and second ends of the third elastic connection being aligned with the third extension along the third direction, the third elastic connection including a transverse portion positioned within the opening in the third mass and extending in a direction transverse to the third direction, the transverse portion being connected between the first end and the second end of the third elastic connection and spaced apart from the third mass in the direction transverse to the third direction; and a fourth elastic connection having a first end connected to the fourth extension and a second end connected to the fourth mass, the first and second ends of the fourth elastic connection being aligned with the fourth extension along the fourth direction, the fourth elastic connection including a transverse portion positioned within the opening in the fourth mass and extending in a direction transverse to the fourth direction, the transverse portion being connected between the first end and the second end of the fourth elastic connection and spaced apart from the fourth mass in the direction transverse to the fourth direction.

7. The device of claim 6 wherein the central support structure has a rectangular shape, the first, second, third, and fourth extensions extending from sides of the rectangular shape.

8. The device of claim 7 wherein the first elastic connection is positioned within the opening in the first mass, the second elastic connection is positioned within the opening in the second mass, the third elastic connection is positioned within the opening in the third mass, and the fourth elastic connection is positioned within the opening in the fourth mass.

9. The device of claim 6, further comprising an anchor on the substrate and positioned centrally with respect to the first, second, third, and fourth masses and the central support structure coupled to the anchor.

10. A device, comprising:
a first trapezoidal mass;
a first plurality of driving electrodes coupled to the first mass;
a second trapezoidal mass;
a second plurality of driving electrodes coupled to the second mass;
a third trapezoidal mass positioned between the first and second masses;
a fourth trapezoidal mass positioned between the first and second masses;
a plurality of elastic coupling elements coupled to the first, second, third, and fourth masses, the plurality of elastic coupling elements configured to move the third and fourth masses in response to movement of the first and second masses by actuation of the driving electrodes;
a central support structure having a first, a second, a third, and a fourth extension respectively extending along a first, a second, a third, and a fourth direction;
a first elastic connection having a first end connected to the first extension and a second end connected to the first mass, the first and second ends of the first elastic connection being aligned with the first extension along the first direction, the first elastic connection including a transverse portion positioned within an opening in the first mass and extending in a direction transverse to the first direction, the transverse portion being connected between the first end and the second end of the first elastic connection and spaced apart from the first mass in the direction transverse to the first direction;

a second elastic connection having a first end connected to the second extension and a second end connected to the second mass, the first and second ends of the second elastic connection being aligned with the second extension along the second direction, the second elastic connection including a transverse portion positioned within an opening in the second mass and extending in a direction transverse to the second direction, the transverse portion being connected between the first end and the second end of the second elastic connection and spaced apart from the second mass in the direction transverse to the second direction;

a third elastic connection having a first end connected to the third extension and a second end connected to the third mass, the first and second ends of the third elastic connection being aligned with the third extension along the third direction, the third elastic connection including a transverse portion positioned within an opening in the third mass and extending in a direction transverse to the third direction, the transverse portion being connected between the first end and the second end of the third elastic connection and spaced apart from the third mass in the direction transverse to the third direction; and a fourth elastic connection having a first end connected to the fourth extension and a second end connected to the fourth mass, the first and second ends of the fourth elastic connection being aligned with the fourth extension along the fourth direction, the fourth elastic connection including a transverse portion positioned within an opening in the fourth mass and extending in a direction transverse to the fourth direction, the transverse portion being connected between the first end and the second end of the fourth elastic connection and spaced apart from the fourth mass in the direction transverse to the fourth direction.

11. The device of claim 10 wherein the first plurality of driving electrodes is positioned within the first mass and the second plurality of driving electrodes is positioned within the second mass.

12. The device of claim 10 wherein the central support includes a central rectangular structure around which the first, second, third, and fourth masses are positioned, the first, second, third, and fourth extensions extending from respective sides of the central rectangular structure.

13. The device of claim 12 wherein the first extension extends into the opening in the first mass, the second extension extends into the opening in the second mass, the third extension extends into the opening in the third mass, and the fourth extension extends into the opening in the fourth mass.

14. The device of claim 13 wherein the first elastic connection is positioned within the opening in the first mass, the second elastic connection is positioned within the opening in the second mass, the third elastic connection is positioned within the opening in the third mass, and the fourth elastic connection is positioned within the opening in the fourth mass.

15. The device of claim 6 wherein the first and second directions are aligned with one another along a first driving axis.

16. The device of claim 15 wherein the third and fourth directions are aligned with one another along a second driving axis.

17. The device of claim 16 wherein the central support structure is independently tiltable about the first driving axis and the second driving axis.

18. The device of claim 10 wherein the first and second directions are collinear with one another along a first driving axis, and the third and fourth directions are collinear with one another along a second driving axis.

19. The device of claim 18 wherein the central support structure is independently tiltable about the first driving axis and the second driving axis.

20. The device of claim 10 wherein the first and second directions are aligned with one another along a first driving axis, and the second and third directions are aligned with one another along a second driving axis.

* * * * *